US 9,014,967 B2

(12) United States Patent
Bernhardt

(10) Patent No.: US 9,014,967 B2
(45) Date of Patent: Apr. 21, 2015

(54) AIRDROP CONTROLLER SYSTEM

(75) Inventor: Roger David Bernhardt, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 13/116,711

(22) Filed: May 26, 2011

(65) Prior Publication Data

US 2012/0303261 A1    Nov. 29, 2012

(51) Int. Cl.
*G01C 21/00* (2006.01)
*B64D 17/00* (2006.01)
*B64D 1/08* (2006.01)
*B64D 17/02* (2006.01)

(52) U.S. Cl.
CPC ............... *B64D 1/08* (2013.01); *B64D 17/025* (2013.01); *G01C 21/00* (2013.01)

(58) Field of Classification Search
USPC ........................... 701/409, 445; 244/142–152
See application file for complete search history.

(56) References Cited

U.S. PATENT DOCUMENTS

| | | | | |
|---|---|---|---|---|
| 5,884,867 A * | 3/1999 | Gordon et al. | ................ | 244/152 |
| 5,899,415 A * | 5/1999 | Conway et al. | ................ | 244/152 |
| 6,042,056 A * | 3/2000 | Chopard | ................ | 244/152 |
| 6,131,856 A * | 10/2000 | Brown | ................ | 244/152 |
| 6,338,457 B1 * | 1/2002 | Hilliard et al. | ................ | 244/139 |
| 6,343,244 B1 | 1/2002 | Yoneda et al. | | |
| 6,587,762 B1 * | 7/2003 | Rooney | ................ | 701/16 |
| 6,758,442 B2 | 7/2004 | Bailey | | |
| 6,889,942 B2 * | 5/2005 | Preston | ................ | 244/152 |
| 7,059,570 B2 * | 6/2006 | Strong | ................ | 244/147 |
| 7,280,917 B2 * | 10/2007 | Hager et al. | ................ | 701/505 |
| 7,703,720 B2 * | 4/2010 | Smith et al. | ................ | 244/152 |
| 2003/0197095 A1 | 10/2003 | Preston | | |
| 2009/0026319 A1 | 1/2009 | Strong | | |

* cited by examiner

*Primary Examiner* — James Trammell
*Assistant Examiner* — Majdi Alsomiri
(74) *Attorney, Agent, or Firm* — Yee & Associates, P.C.

(57) ABSTRACT

A method and apparatus comprising a housing, a processor unit, a display, a navigation module, and a number of modules. The navigation module is configured to guide an airdrop system to a target location. The number of modules is configured to provide functions for use by a number of operators to perform a mission in addition to an airdrop.

19 Claims, 9 Drawing Sheets

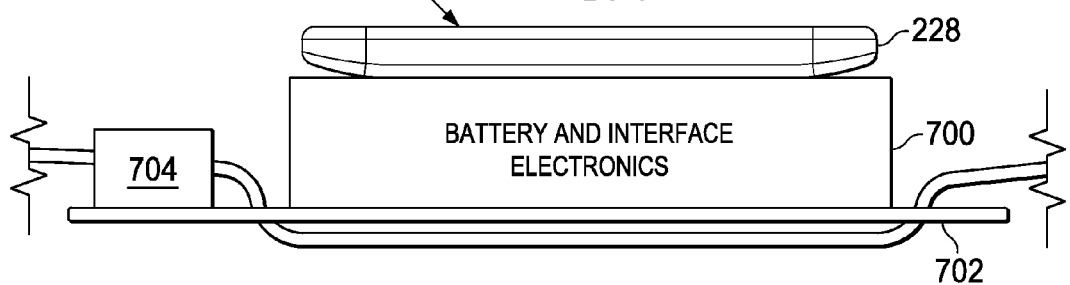
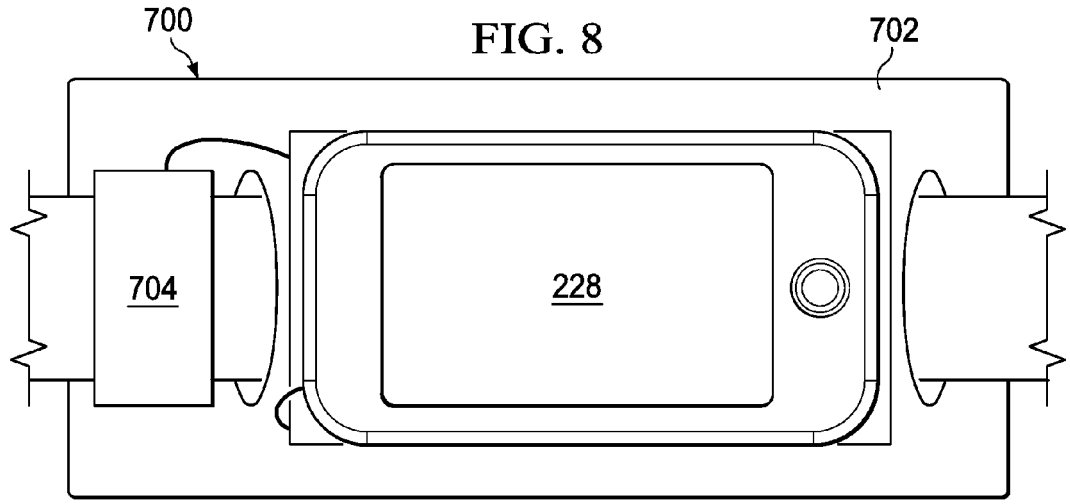

FIG. 12
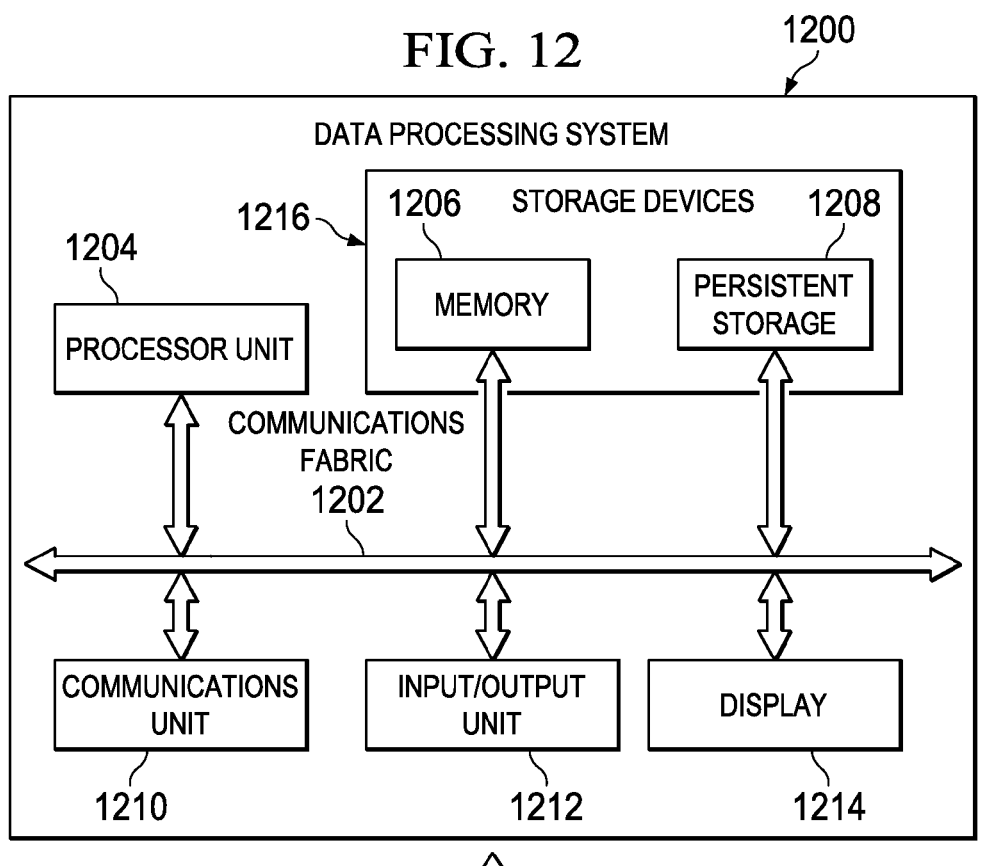
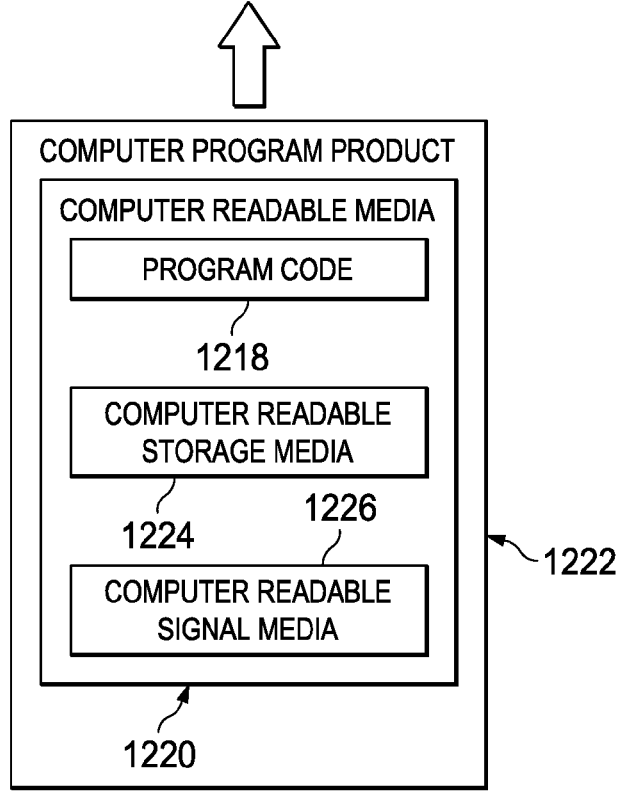

AIRDROP CONTROLLER SYSTEM

BACKGROUND INFORMATION

1. Field

The present disclosure relates generally to airdrops and, in particular, to controlling airdrops. Still more particularly, the present disclosure relates to a method and apparatus for using enhanced multi-function controllers to manage airdrops.

2. Background

Airdrops are typically used to deliver cargo to various locations in which other types of cargo delivery systems may not be able to access as easily or as quickly. Airdrops may be used to re-supply troops, provide humanitarian aid, deliver equipment, deliver vehicles, and for other suitable types of purposes.

An airdrop may be performed using an airdrop system that comprises a payload attached to a parachute. The airdrop system also may be steered towards a target location as the airdrop system descends toward the ground. Airdrops may include low velocity airdrops, high velocity airdrops, free fall airdrops, high altitude airdrops, low altitude airdrops, and other suitable types of airdrops.

An airdrop system may include, for example, a parachute, a payload, electric or pyro-electric actuators, a computer, a global positioning system, navigation control software, and other suitable types of components. The actuators may be attached to a structure on which a payload is located or may be attached directly to the payload. These actuators may be controlled by the computer, the navigation control software running on the computer, and possibly with the use of a global positioning system to control the flight path of the airdrop system toward a target location.

In designing and manufacturing airdrop systems, the cost of components may be a factor in selecting components for an airdrop system. Oftentimes, after the airdrop occurs, some or all of these components may not be reusable or may not be returned for future airdrops. For example, a parachute or pallet on which cargo is placed in the airdrop system may be rendered unusable during the landing of the airdrop system. In other examples, circumstances may prevent recovery of these components. For example, a human operator receiving the cargo may be unable to transport the different components of the airdrop system. Present airdrop control is accomplished with single-purpose devices useful only for control during the airdrop mission segment.

As a result, these components may be left at the target location or destroyed. Thus, it is desirable to increase the usefulness of an airdrop system.

Further, the weight of these components also may be considered when selecting the components for an airdrop system. The weight of these components, along with the weight of the payload, may affect the amount of time and distance that an airdrop system can travel with the payload. Depending on the use, the weight may be greater than desired.

Further, the weight of the airdrop system may cause undesirable constraints on the size and design of the parafoil for the airdrop system, as well as other components. In addition, the weight and/or size of these components may increase the difficulty in retrieving the components for reuse at a later time. Weight and size of components also impact fuel costs and space efficiency of aircraft cargo usage for aerial delivery.

Therefore, it would be advantageous to have a method and apparatus that takes into account at least some of the issues discussed above, as well as other possible issues.

SUMMARY

In one advantageous embodiment, an apparatus comprises a housing, a processor unit, a display, a navigation module, and a number of modules. The navigation module is configured to guide an airdrop system to a target location. The number of modules is configured to provide functions for use by a number of operators performing a mission in addition to an airdrop.

In another advantageous embodiment, a method for configuring a controller for an airdrop system is provided. An airdrop navigation module is placed in the controller. The airdrop navigation module is to guide the airdrop system to a target location. A number of modules selected for a mission are placed in the controller, wherein the mission is in addition to an airdrop.

In another advantageous embodiment, a method for performing a mission is provided. A module from a number of modules in a controller is identified for use in performing a number of operators in the mission in which the mission is in addition to an airdrop. The controller comprises a housing, a processor unit, a display, a navigation module, and the number of modules. The navigation module is configured to guide an airdrop system to a target location. The number of modules is configured to provide functions for use by a number of operators to perform operations for the mission. The number of operations is performed in the mission using the module.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is an illustration of a configuration of a controller with other components in an airdrop system in accordance with an advantageous embodiment;

FIG. 8 is an illustration of a top view of a controller with other components in an airdrop system in accordance with an advantageous embodiment;

FIG. 12 is an illustration of a data processing system in accordance with an advantageous embodiment.

DETAILED DESCRIPTION

The different advantageous embodiments recognize and take into account that with currently-used airdrop systems, the controllers are only configured to perform functions relating to guiding the airdrop system to a desired location. The different advantageous embodiments recognize and take into account that with this type of controller, the controller is only useful during the airdrop.

The different advantageous embodiments recognize and take into account that with currently-used controllers, after the airdrop system has reached a target location, the controller may be retrieved for use in later airdrop missions. Further, the different advantageous embodiments recognize and take into account that with this type of controller, a human operator on the ground receiving a payload may have to carry and store the controller until it can be returned for further airdrops.

Figure 1:
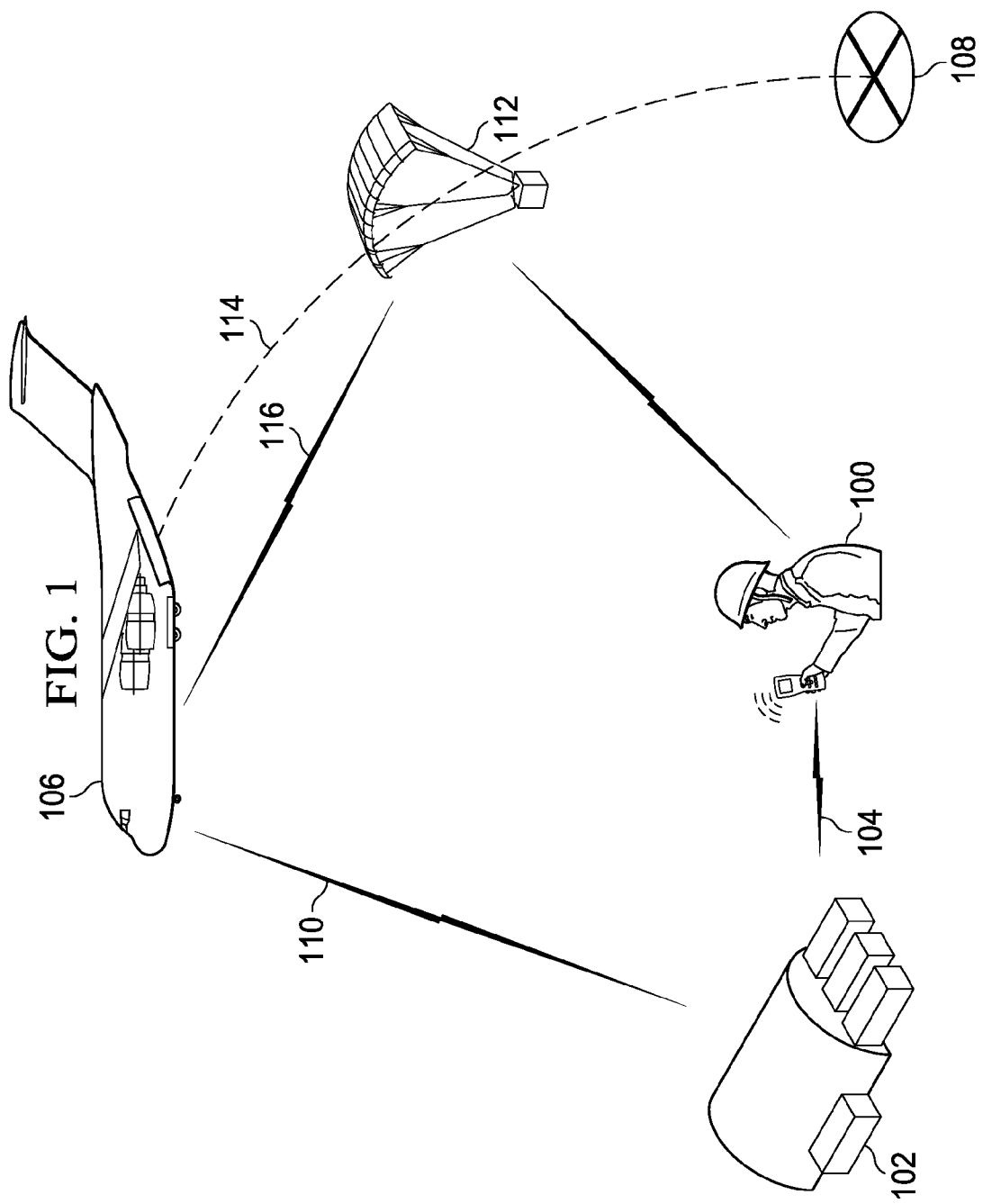
FIG. 1 is an illustration of an airdrop mission in accordance with an advantageous embodiment.

With reference now to the figures and, in particular, with reference now to FIG. 1, an illustration of an airdrop mission is depicted in accordance with an advantageous embodiment. As depicted, requester 100 has requested supplies from ground station 102. In these illustrative examples, requester 100 is a human operator who sends the request using wireless communications link 104. The request may be made using any requesting system or technique currently known for requesting supplies in these illustrative examples.

In response to receiving the request, ground station 102 dispatches or sends instructions to aircraft 106 to deliver supplies to requester 100. These instructions are sent over wireless communications link 110 in these illustrative examples.

Aircraft 106 travels near target location 108 and releases airdrop system 112. Airdrop system 112 travels along path 114 to target location 108 in this illustrative example.

Airdrop system 112 may adjust path 114 to reach target location 108 in these illustrative examples. These adjustments may be made in response to various factors, such as wind and changes in weather.

Further, in some cases, airdrop system 112 may receive commands or updates through wireless communications link 116. These updates may be, for example, a change in location or some other suitable type of update.

In these illustrative examples, when airdrop system 112 reaches target location 108, requester 100 or other operators may retrieve supplies from the payload in airdrop system 112. Further, with the different illustrative embodiments, a controller in airdrop system 112 may provide further uses in addition to guiding airdrop system 112 to target location 108. In these illustrative examples, the controller may be programmed to provide other functionality to requester 100 to perform a mission, monitor supplies, and/or other functions for a particular mission. The particular mission may be a current mission or a mission to be performed at some future point in time.

Figure 2:
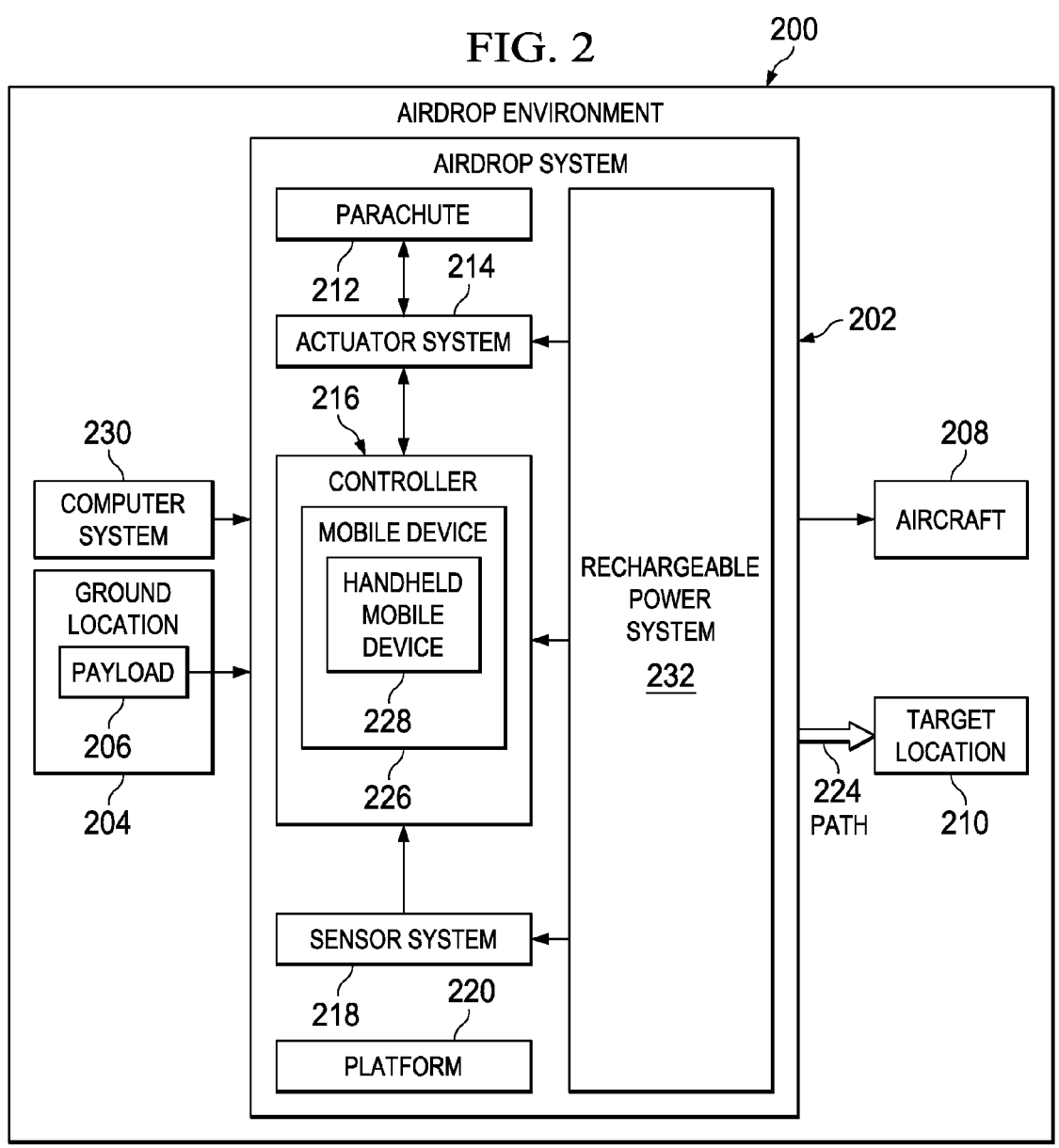
FIG. 2 is an illustration of a block diagram of an airdrop environment in accordance with an advantageous embodiment.

With reference now to FIG. 2, an illustration of a block diagram of an airdrop environment is depicted in accordance with an advantageous embodiment. Airdrop environment 200 is an example of components that may be used to perform missions, such as the airdrop mission in FIG. 1.

In this illustrative example, airdrop system 202 may be configured at ground location 204. For example, payload 206 may be loaded into airdrop system 202 at ground location 204. Payload 206 may take various forms. For example, payload 206 may be supplies, a vehicle, and/or other suitable types of payloads.

After airdrop system 202 has been configured for use, airdrop system 202 may be loaded into aircraft 208. Aircraft 208 may then fly and drop airdrop system 202 to deliver payload 206 to target location 210.

In these illustrative examples, airdrop system 202 comprises parachute 212, actuator system 214, controller 216, sensor system 218, and platform 220. Parachute 212 may be a steerable parachute. For example, parachute 212 may take the form of a parasail. Other components may be included in addition to, and/or in place of the ones illustrated for airdrop system 202. These components may be selected as ones needed to deliver payload 206 to target location 210 or other components needed for use by one or more operators in a mission.

In these illustrative examples, actuator system 214 is configured to change the configuration of parachute 212 to change the direction along which airdrop system 202 travels. Sensor system 218 is configured to provide information about the environment around airdrop system 202, as well as information about airdrop system 202. For example, sensor system 218 may be configured to provide location information about the location of airdrop system 202. Sensor system 218 may be, for example, a global positioning system receiver, an inertial measurement unit, or some other suitable type of sensor system. As another example, sensor system 218 may include an altimeter that provides an altitude or distance above the ground for airdrop system 202.

In another example, sensor system 218 may provide information about payload 206 via radio frequency identification tag (RFID) or wired connection. In yet another example, sensor system 218 may include a biometric sensor, such as face recognition camera/software, an iris identification sensor, or a fingerprint reader. Sensor system 218 may include a sniper optics detection capability.

As another option, sensor system 218 might be one set of sensors to accomplish many of the prior mentioned functions not directly related to the airdrop segment of the mission, but used outside of the airdrop segment.

Platform 220 is a structure configured to hold payload 206. For example, platform 220 may be a pallet, a plate, a net, and/or some other suitable structure. Platform 220 may be any structure on which payload 206 may be placed on or contained in for delivery.

Controller 216 is a hardware component and may include software. Controller 216 is configured to control the operation of actuator system 214. Controller 216 may steer or guide the movement of airdrop system 202 along path 224 to reach target location 210. In these illustrative examples, controller 216 may take the form of mobile device 226. In particular, controller 216 may be handheld mobile device 228. Handheld mobile device 228 is a device that can be held in one hand of a human operator. In this form, handheld mobile device 228 may be placed into a pocket or a container for storage or transport.

In these illustrative examples, controller 216 is configured to also include other functionality in addition to controlling the movement of airdrop system 202 along path 224 to target location 210. Controller 216 may include additional functions that may be used by a requestor or other human operators who receive payload 206.

In these illustrative examples, computer system 230 may configure controller 216 for use in delivering airdrop system 202 to target location 210. In addition, computer system 230 also may configure controller 216 to perform other functions before or after payload 206 has been delivered by airdrop system 202 to target location 210.

In other words, controller 216 may be configured for missions in addition to the delivery of payload 206. For example, the mission may be a configuration of airdrop system 202 prior to delivery of airdrop system 202 to target location 210. As another example, the mission may be one performed by one or more human operators after airdrop system 202 reaches target location 210.

Computer system 230 comprises a number of computers. When more than one computer is present in computer system 230, these computers may be in communication with each other. The communication may be performed using wired communications links, wireless communications links, or a combination of the two. The communications links may be provided through a network or other type of communications architecture.

In these illustrative examples, computer system 230 may be at different locations. For example, computer system 230 may be located at ground location 204, in aircraft 208, or in some other suitable location. Computer system 230 may be distributed such that computer system 230 may be at more than one location.

The functionality configured for controller 216 may depend on the needs of the human operator who may use controller 216 before or after payload 206 has been delivered. Controller 216 may be configured by computer system 230 prior to airdrop system 202 being placed in aircraft 208.

In other illustrative examples, controller 216 may be programmed while airdrop system 202 is in aircraft 208 and aircraft 208 travels towards target location 210. In these illustrative examples, the programming of controller 216 may be performed using wireless or wired connections, depending on the particular implementation. One or more of the different advantageous embodiments may provide additional functions to controller 216 such that controller 216 may be usable before and/or after payload 206 has been delivered for various mission capabilities. As a result, an additional data processing system or other device is not necessary to be included with payload 206 to provide additional capabilities to requestors receiving payload 206. Instead, this functionality may be included in controller 216. As a result, the weight of payload 206 with airdrop system 202 may be reduced as compared to including additional equipment that performs functionality that may be included within controller 216.

In these illustrative examples, controller 216 may be used by computer 230 prior to airdrop system 202 being placed on aircraft 208. Further, controller 216 also may be used by operators prior to or while airdrop system 202 is in aircraft 208. In these illustrative examples, operators onboard aircraft 208 may use controller 216 in a number of different ways. For example, the operators may use controller 216 to perform operations for a mission. These operations may include, for example, without limitation, training, airdrops, and other suitable types of operations.

Airdrop system 202 also may include rechargeable power system 232. This system may be a modular one. Rechargeable power system 232 may provide power to various components in airdrop system 202. For example, rechargeable power system 232 may provide power to actuator system 214, controller 216, and sensor system 218. Further, rechargeable power system 232 also may be used after airdrop system 202 has been delivered to target location 210. For example, rechargeable power system 232 may be used to recharge and provide power to mobile device 226, as well as other devices. Solar, wind, vibration, or other energy harvesting elements make the independent and separable rechargeable power system 232 a long-term useful capability to the operations before and/or after airdrop system 202 has been delivered.

The illustration of airdrop environment 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, platform 220 may be unnecessary in some cases, with parachute 212 being directly connected to payload 206. In still other illustrative examples, sensor system 218 may be omitted. In still another illustrative example, airdrop system 202 may include another parachute in addition to parachute 212. As still another illustrative example, airdrop system 202 may include an air propulsion system, such as a motor with a propeller.

In another example, although sensor system 218 is depicted as a separate component from controller 216, sensor system 218 may be integral or part of controller 216 in some illustrative examples. These and other modifications may be made, depending on the implementation.

Figure 3:
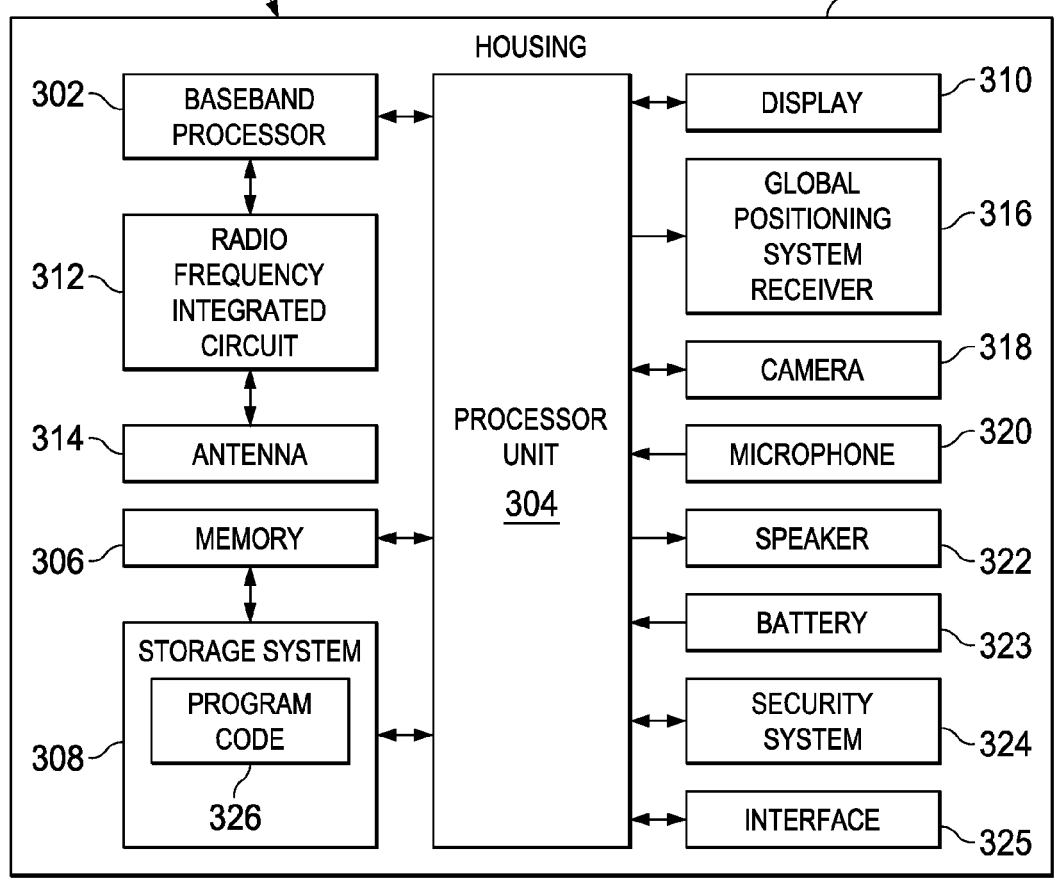
FIG. 3 is an illustration of a handheld mobile device in accordance with an advantageous embodiment.

With reference now to FIG. 3, an illustration of a handheld mobile device is depicted in accordance with an advantageous embodiment. In this depicted example, examples of components that may be used to implement controller 216 in the form of mobile handheld device 228 in FIG. 2 are depicted in accordance with an advantageous embodiment.

In this illustrative example, handheld mobile device 228 has housing 300. Housing 300 is a housing that is configured to be held in the hand of a human operator in these illustrative examples. Housing 300 holds or is connected to components, such as baseband processor 302, processor unit 304, memory 306, storage system 308, display 310, radio frequency integrated circuit (RFIC) 312, antenna 314, global positioning system receiver 316, camera 318, microphone 320, speaker 322, battery 323, security system 324, and interface 325.

Baseband processor 302 is a hardware device and is configured to provide receiver and transmitter operations. These operations are performed in exchanging information over wireless communications links. Baseband processor 302 also may take the form of a transceiver. In particular, baseband processor 302 handles audio, signal, and data processing needed to receive and send data using radio frequency transmissions or other types of wireless transmissions.

Processor unit 304 is a hardware device and may be implemented using any suitable type of processor. For example, processor unit 304 may be one or more processors, such as those used in computer systems, mobile phones, and/or other suitable types of devices.

As depicted, processor unit 304 is configured to provide processing power for other functions within handheld mobile device 228. These functions may include, for example, without limitation, calculators, calendars, alarms, navigation, and other suitable types of functions. These different functions may be provided through software, hardware, or a combination of the two.

When hardware is used, these functions may be hardware circuits located within or connected to processor unit 304. In the illustrative examples, this hardware may take the form of a circuit system, an integrated circuit, an application specific integrated circuit (ASIC), a programmable logic device, and/or some other suitable type of hardware configured to perform a number of operations.

With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices.

When software is used to provide functions, the software may be stored as program code 326 in storage system 308. Program code 326 may be run by processor unit 304 from storage system 308 via memory 306.

Storage system 308, in these illustrative examples, is one or more hardware storage devices. Storage system 308 may be a solid state storage device, a hard disk drive, or some other suitable type of storage device.

Display 310, in these illustrative examples, is a hardware device that may be in the form of a touch screen display. Display 310 is configured to display information and receive user input.

Of course, other types of user input devices may be used in addition to or in place of a touch screen for display 310. For example, without limitation, at least one of keyboards, joysticks, a computer mouse, a stylus, or other input devices may be included as part of controller 216 in FIG. 2. In these illustrative examples, these devices may be connected to controller 216 or components in controller 216.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

A pathway for the transmission of voice and other types of data may occur using radio frequency integrated circuit 312. Radio frequency integrated circuit 312 is connected to baseband processor 302 and antenna 314.

Global positioning system receiver 316 is a hardware system configured to provide position information to processor unit 304. Global positioning system receiver 316 may generate coordinates, such as longitude, latitude, and altitude. Further, global positioning system receiver 316 also may provide a current time for use by processor unit 304.

Microphone 320 and speaker 322 are hardware components that may be used to provide additional forms of input and output in handheld mobile device 228. For example, microphone 320 may be used to receive and record sounds and voice communications. Speaker 322 may be used to audibly present voice, sounds, and/or other information. Battery 323 is configured to provide power to the different components in controller 216 in FIG. 2.

Security system 324 also may be located in housing 300. Security system 324 may be used to prevent unauthorized access to controller 216. For example, security system 324 may be used with authentication systems, such as passwords and user identifiers.

In other illustrative examples, security system 324 may include a radio frequency identifier reader to read badges or other cards that are configured to be used by persons who are authorized to have access to controller 216. In other illustrative examples, security system 324 may include biometric devices to verify a user. For example, a fingerprint reader, an iris scanner, and/or other types of biometric devices may be present in security system 324.

With security system 324, unauthorized use of controller 216 may be prevented. If an operator is not authorized to use controller 216, controller 216 may not function at all or may only provide limited functions. Further, different operators may be provided different types of functionality based on the type of access selected for particular operators through the use of security system 324.

In these illustrative examples, interface 325 is a hardware interface. Interface 325 is configured to provide a connection between handheld mobile device 228 and other components in airdrop system 202 in FIG. 2. For example, interface 325 may be used to connect handheld mobile device 228 to actuator system 214, sensor system 218, and other suitable components in airdrop system 202 in FIG. 2. Interface 325 may be, for example, a serial bus, a universal serial bus, a parallel port, a network interface, and/or other suitable types of interfaces.

The illustration of components for handheld mobile device 228 in FIG. 3 is not meant to imply limitations to the manner in which handheld mobile device 228 may be implemented. For example, in some implementations, baseband processor 302, radio frequency integrated circuit 312, and antenna 314 may be omitted. In still other illustrative examples, camera 318 or security system 324 also may be omitted from handheld mobile device 228. In still other illustrative examples, a physical keyboard may be used in addition to and/or in place of the touch screen in display 310. As another example, other types of positioning or navigation systems may be used in addition to and/or in place of global positioning system receiver 316.

Figure 4:
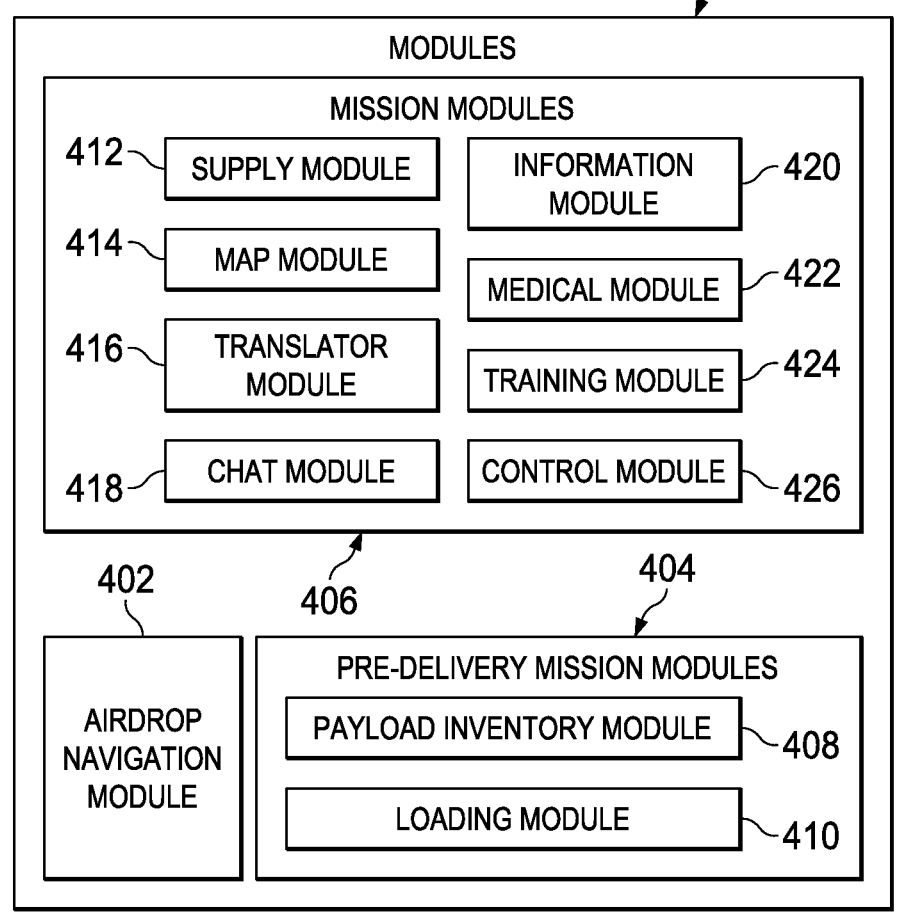
FIG. 4 is an illustration of modules that may be implemented in a controller in accordance with an advantageous embodiment.

With reference now to FIG. 4, an illustration of modules that may be implemented in a controller is depicted in accordance with an advantageous embodiment. In these illustrative examples, modules 400 are examples of some modules that may be used in controller 216 in FIG. 2. A number of modules may be configured to provide functions for use by an operator performing a mission. This mission may be performed by an operator receiving the payload in the airdrop system or by an operator configuring the airdrop system.

In particular, modules 400 may be implemented in handheld mobile device 228 in FIG. 2. Modules 400 may be implemented using hardware, software, or a combination of the two.

When implemented using hardware, modules 400 may take the form of hardware circuits that may be pre-programmed or programmed to provide the desired functionality. When in the form of software, modules 400 may take the form of program code that is stored on storage system 308 in FIG. 3.

In these illustrative examples, the desired functionality may be for the performance of the mission. In these illustrative examples, the mission may include missions other than the delivery of airdrop system 202. For example, modules 400 may include modules used to perform operations for missions, such as loading of airdrop systems, configuring airdrop systems, and other operations that may be performed prior to delivery of the airdrop systems. As another example, modules 400 also may include modules for use in performing operations for missions that may occur after airdrop system 202 has been delivered. Further, these modules also may include modules for use during delivery of airdrop system 202 that may involve operations other than the delivery of the airdrop systems.

In these illustrative examples, modules 400 include airdrop navigation module 402. Airdrop navigation module 402 is configured to generate commands to actuator system 214 to control the movement of airdrop system 202 along path 224 to target location 210 in these illustrative examples. Airdrop navigation module 402 is configured to receive information from components in airdrop system 202. For example, airdrop navigation module 402 may receive information from sensor system 218, actuator system 214, rechargeable power system 232, and/or other suitable components.

Airdrop navigation module 402 may be implemented using any currently-available navigation processes used to provide navigation for airdrop systems. Additionally, modules 400 may include at least one of pre-delivery mission modules 404, in addition to mission modules 406. One or more of these modules may be included in modules 400.

In these illustrative examples, pre-delivery mission modules 404 may include modules configured for use prior to airdrop system 202 being dropped from aircraft 208 during flight for delivery to target location 210. For example, pre-delivery mission modules 404 may include payload inventory module 408, loading module 410, and other suitable types of modules.

Payload inventory module 408 may be configured to aid a person placing elements of payload 206 into airdrop system 202 in FIG. 2. Payload inventory module 408 may provide a checklist for equipment, supplies, or other items that are to be part of payload 206. Payload inventory module 408 also may include instructions on the order and how items are to be placed into airdrop system 202 in FIG. 2. For example, payload inventory module 408 may identify a location and order in which items should be stacked on platform 220. As another example, payload inventory module 408 may provide instructions as to how a vehicle should be attached to other components in airdrop system 202, such as parachute 212. As another example, payload inventory module 408 may identify the recipient of the payload elements.

Loading module 410 may include instructions and/or training to aid human operators in loading airdrop systems into aircraft 208. Loading module 410 also may include an identification of the order and locations for different airdrop systems to be placed into aircraft 208.

Mission modules 406 include modules that may be used by human operators who have controller 216 after airdrop system 202 has reached target location 210. Mission modules 406 may be selected based on the particular needs of the human operators. For example, mission modules 406 include supply module 412, map module 414, translator module 416, chat module 418, information module 420, medical module 422, training module 424, control module 426, and/or other suitable types of modules.

Supply module 412 may be used to inventory supplies. Further, supply module 412 also may be used to order supplies. For example, if supplies are associated with RFID tags, supply module 412 may be used to track the usage of supplies and/or order supplies. Supplies may be automatically ordered when the inventory of supplies is less than some threshold level or at each use.

Map module 414 may provide maps of different areas that the human operators may need. As another example, translator module 416 may provide text and/or voice translations for different languages.

Chat module 418 is an example of a type of communications module that may be included in mission modules 406. Chat module 418 may allow an operator to send and receive messages.

Information module 420 may be used to locate objects, such as shelter, food, water, threats, or other suitable types of objects. These location modules may include maps, directions, and other suitable information. Information module 420 may include instructions, maps, and other information on how to locate or identify various objects. For example, if shelter or supplies are at various locations and have beacons associated with those objects, information module 420 may be used to identify signals from those beacons received by controller 216.

Medical module 422 may provide information and instructions, as well as diagnostic functions for medical operations. For example, medical module 422 may be used to help in the prevention and treatment of injuries and/or illnesses that may occur.

Training module 424 may be configured to direct operators on performing operations for training exercises, as well as provide other training functions.

Control module 426 may be used to control other devices. These devices may be computer systems, unmanned aerial vehicles, unmanned ground vehicles, unmanned water vehicles, sensors, and other suitable types of objects.

The configuration of modules 400 may be performed at different times. For example, modules 400 may be configured prior to the assembly of airdrop system 202, during the assembly or configuration of airdrop system 202, while aircraft 208 is in flight with airdrop system 202, and other suitable times.

This configuration of modules 400 may include activating or loading modules 400 onto controller 216. In some illustrative examples, if storage system 308 permits, all of modules 400 may be stored on storage system 308 in FIG. 3. Then, modules in modules 400 that are needed may be activated, or modules in modules 400 that are unneeded may be deleted at that point in time. With the ability to configure modules 400 for controller 216, controller 216 may be used before or after delivering airdrop system 202 to target location 210. In some cases, modules 400 also may be used before airdrop system 202 has been delivered to target location 210.

These different types of functionality may be provided by including at least one of pre-delivery mission modules 404 and mission modules 406 with airdrop navigation module 402 in controller 216. With these modules, costs and weight may be reduced, because controller 216 has more than one use. Mission performance may be enhanced without adding significant weight because of the incremental integration of capability. Further, concerns with the cost of components, such as controller 216, may be reduced, because these controllers may be used for other purposes by human operators who receive payload 206.

Further, access to modules 400 may be limited to operators that are authorized to use modules 400. The access may be controlled by modules 400 and/or security system 324 in FIG. 3. Also, different operators may have different types of access to modules 400.

The illustration of modules 400 in FIG. 4 is not meant to imply limitations to the manner in which modules 400 may be implemented in handheld mobile device 228. For example, other types of modules may be used in addition to and/or in place of the modules illustrated for pre-delivery mission modules 404 and mission modules 406. For example, modules for mental health, entertainment, and other suitable functions may be included.

In still other illustrative examples, an additional airdrop navigation module may be present in addition to airdrop navigation module 402. An additional airdrop navigation module may be present in case a last minute change is made to the configuration of airdrop system 202 or if the type of airdrop changes from one altitude to another altitude.

Figure 5:
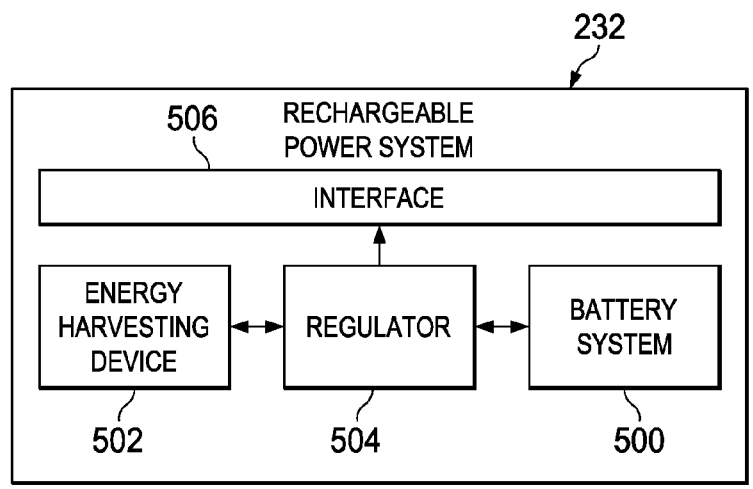
FIG. 5 is an illustration of a rechargeable power system in accordance with an advantageous embodiment.

With reference now to FIG. 5, an illustration of a rechargeable power system is depicted in accordance with an advantageous embodiment. In this illustrative example, examples of components that may be used in rechargeable power system 232 in FIG. 2 are illustrated.

As depicted, rechargeable power system 232 comprises battery system 500, energy harvesting device 502, regulator 504, and interface 506. These components are hardware components in the depicted examples.

Battery system 500 may comprise one or more batteries. These batteries may take various forms. For example, the batteries may be lithium ion batteries. The batteries selected for battery system 500 are batteries that may be rechargeable in these illustrative examples.

Energy harvesting device 502 is a power generation source that generates electricity to recharge battery system 500. Energy harvesting device 502 may use solar power, thermal energy, wind energy, kinetic energy, and other types of energy. In this illustrative example, energy harvesting device 502 may take the form of one or more solar cells. As depicted, regulator 504 regulates the voltage and current that is sent to and from battery system 500. Interface 506 provides an interface to connect devices, such as controller 216 in FIG. 2. For example, interface 506 in rechargeable power system 232 may be connected to interface 325 in FIG. 3 for handheld mobile device 228 in FIG. 2. In this manner, rechargeable power system 232 has additional uses in addition to powering devices in airdrop system 202 in FIG. 2.

Figure 6:
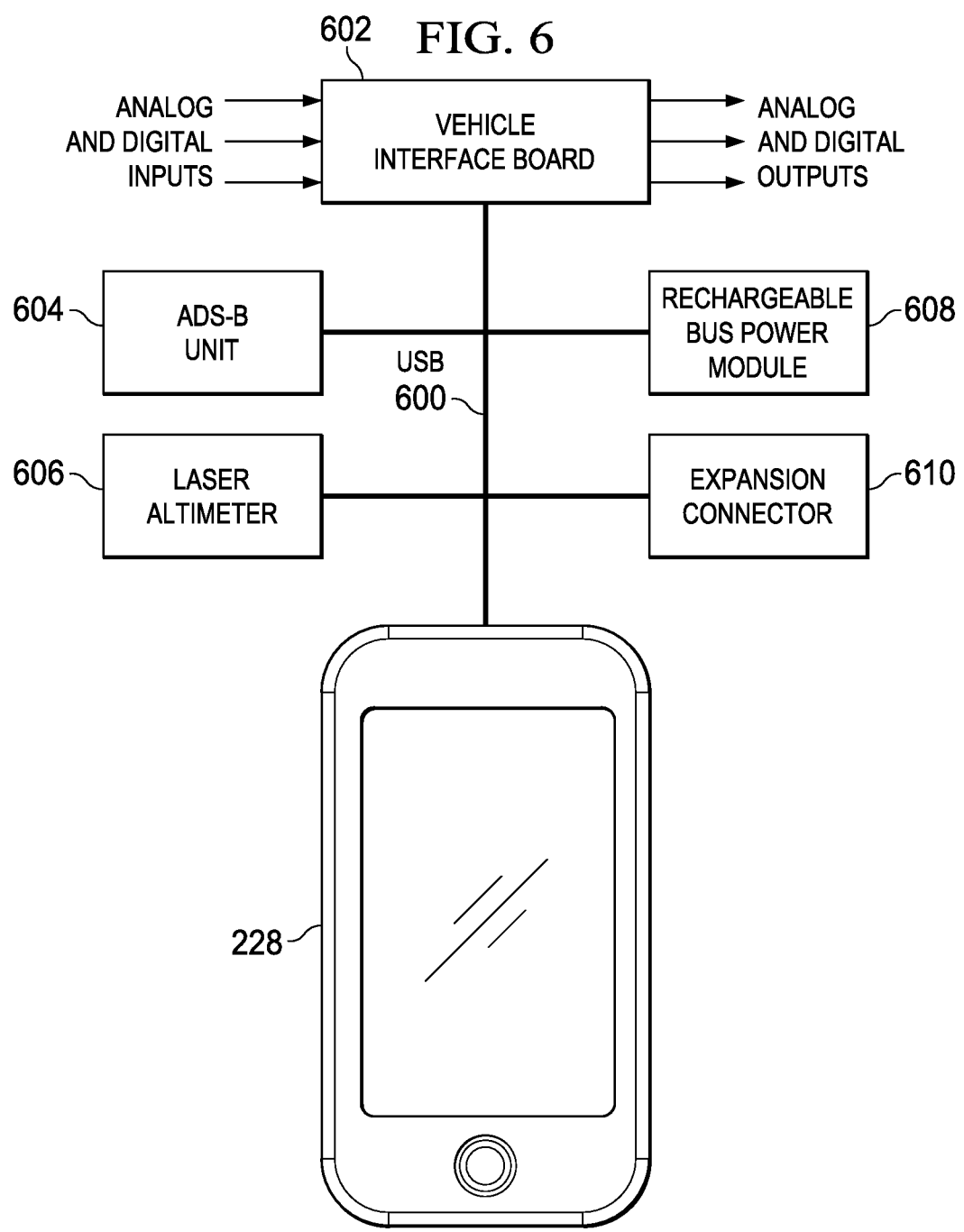
FIG. 6 is an illustration of a diagram illustrating a connection of a controller to an airdrop system in accordance with an advantageous embodiment.

With reference now to FIG. 6, an illustration of a diagram illustrating a connection of a controller to an airdrop system is depicted in accordance with an advantageous embodiment. In this illustrative example, an illustration of controller 216 in the form of handheld mobile device 228 connected to other components in airdrop system 202 in FIG. 2 is depicted in accordance with an advantageous embodiment.

As depicted, handheld mobile device 228 is connected to universal serial bus system 600. Other components on universal serial bus system 600 include vehicle interface board 602, automatic dependent surveillance-broadcast (ADS-B) unit 604, laser altimeter 606, rechargeable bus power module 608, and expansion connector 610.

Vehicle interface board 602 is configured to be connected to components in airdrop system 202. For example, vehicle interface board 602 may be connected to actuator system 214 in airdrop system 202 in FIG. 2.

Automatic dependent surveillance-broadcast unit 604 is configured to send signals to provide a location of airdrop system 202. Automatic dependent surveillance-broadcast unit 604 is an example of a sensor in sensor system 218 in FIG. 2. This component may include a global positioning system receiver and circuitry to broadcast information about the position of airdrop system 202. Laser altimeter 606 is an example of a sensor in sensor system 218. This component may be used to provide altitude information.

Rechargeable bus power module 608, in this example, is an example of rechargeable power system 232 in FIG. 2. Rechargeable bus power module 608 provides power to components connected to universal serial bus system 600.

Universal serial bus system 600 is a bus system that interconnects the different components. For example, interface 325 in FIG. 3 in controller 216 may be connected to universal serial bus system 600. This connection may be used to communicate and control other components and receive power. Of course, other types of buses may be used instead of and/or in place of universal serial bus system 600, depending on the particular implementation.

The components depicted in this example are only examples of components that may be connected to controller 216. Of course, other components may be used in addition to and/or in place of the ones illustrated in this particular example.

With reference now to FIG. 7, an illustration of a configuration of a controller with other components in an airdrop system is depicted in accordance with an advantageous embodiment. In this illustrative example, a side view of a portion of airdrop system 202 in FIG. 2 is depicted in a physical form. These are illustrations of how some of the components shown in block form may be implemented in a physical form.

As illustrated, handheld mobile device 228 is configured for connection to housing 700. Housing 700 contains other components for airdrop system 202, such as those illustrated in FIG. 6. For example, vehicle interface board 602, automatic dependent surveillance-broadcast unit 604, laser altimeter 606, expansion connector 610, and rechargeable bus power module 608 may all be located within housing 700.

Housing 700 may be mounted to plate 702. In this illustrative example, release cutter 704 also may be mounted on plate 702. Release cutter 704 may be controlled by controller 216. Release cutter 704 may be used to cut a canopy release strap for parachute 212 for airdrop system 202 in FIG. 2. Cutting the strap allows parachute 212 to separate from the rest of airdrop system 202.

Turning now to FIG. 8, an illustration of a top view of a controller with other components in an airdrop system is depicted in accordance with an advantageous embodiment. In this illustrative example, a top view of handheld mobile device 228 and housing 700 is depicted in accordance with an advantageous embodiment.

Figure 9:
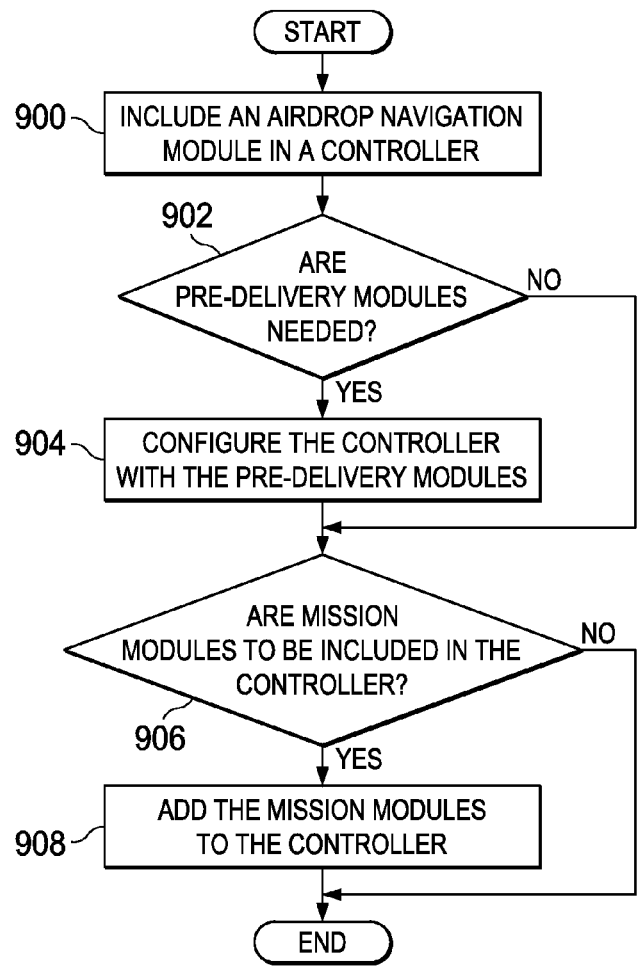
FIG. 9 is an illustration of a flowchart of a process for configuring a controller in accordance with an advantageous embodiment.

With reference now to FIG. 9, an illustration of a flowchart of a process for configuring a controller is depicted in accordance with an advantageous embodiment. This process may be implemented in computer system 230 to configure controller 216 in FIG. 2. In particular, this process may be used to select modules from modules 400 in FIG. 4 that will be present for use in controller 216 in FIG. 2.

The process begins by including an airdrop navigation module in a controller (operation 900). Thereafter, the process determines whether pre-delivery modules are needed (operation 902). If pre-delivery modules are needed, the process configures the controller with the pre-delivery modules (operation 904).

Thereafter, a determination is made as to whether mission modules are to be included in the controller (operation 906). If mission modules are to be included, the process adds the mission modules to the controller (operation 908), with the process terminating thereafter.

With reference again to operation 906, if mission modules are not needed, the process terminates thereafter.

With reference again to operation 902, if pre-delivery modules are not needed, the process proceeds to operation 906 to determine whether mission modules are needed.

This process may be used prior to when airdrop system 202 in FIG. 2 has been completed. Additionally, this process also may be used while aircraft 106 in FIG. 1 is in the air.

Figure 10:
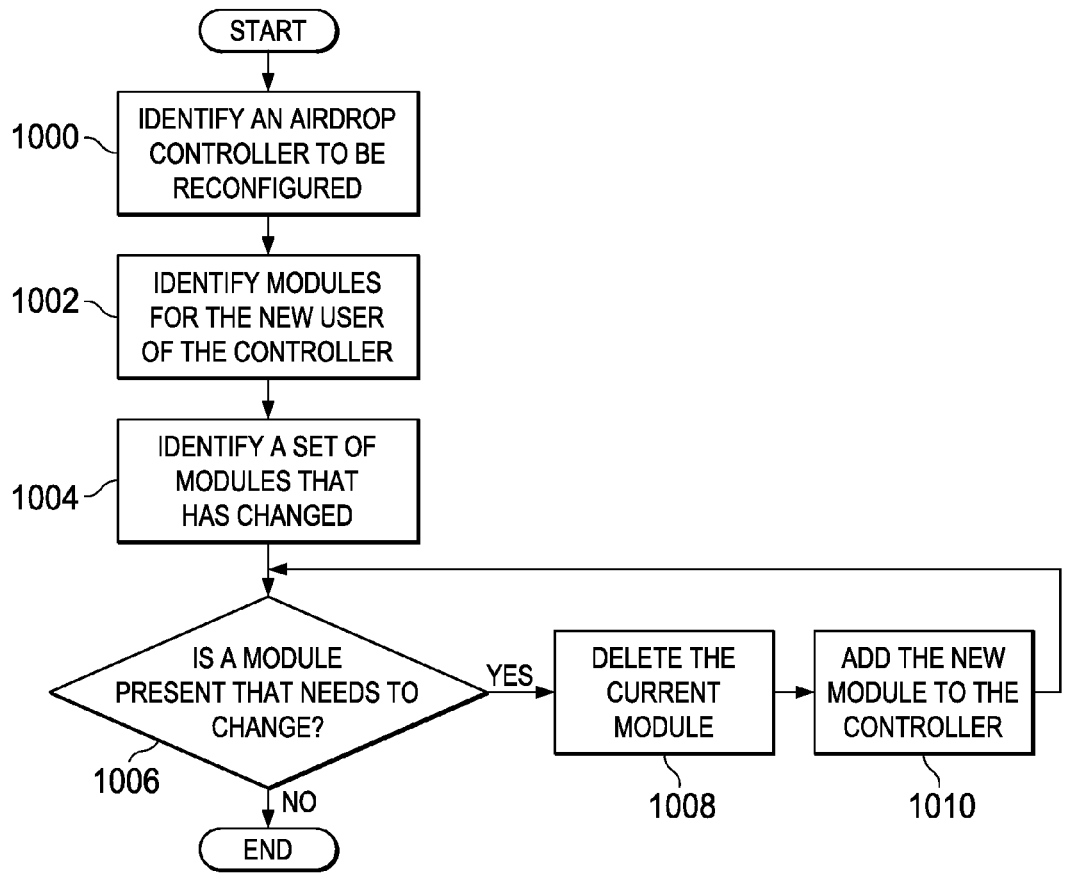
FIG. 10 is an illustration of a flowchart of a process for reconfiguring a controller in accordance with an advantageous embodiment.

With reference now to FIG. 10, an illustration of a flowchart of a process for reconfiguring a controller is depicted in accordance with an advantageous embodiment. This process may be implemented in computer system 230 to configure controller 216 in FIG. 2.

In particular, this process may be used to make changes that may be needed after a controller has already been configured. For example, if an order in which the payloads are to be dropped changes, one airdrop system that was originally designated to be delivered to one human operator may be delivered to a different human operator. If the payload is the same, this change in order may be more easily made. However, the configuration of modules in the controllers may be different for different recipients even though the payloads may be the same.

Each airdrop system may have modules configured for a particular person. If the order in which payloads are to be delivered changes, the target locations of those airdrop systems also may change. As a result, modules preconfigured for a particular controller may no longer be useful for the particular human operator who is to receive the payload.

The process begins by identifying an airdrop controller to be reconfigured (operation 1000). The process identifies modules for the new user of the controller (operation 1002). The process then identifies a set of modules that has changed (operation 1004). A set, as used herein with reference to items, means zero, one, or more items. For example, a set may be an empty set. In some cases, the modules may not change, even though the end users for the modules have changed.

The process determines whether a module is present that needs to be changed (operation 1006). If a module is present, the process deletes the current module (operation 1008). The process then adds the new module to the controller (operation 1010). The process then returns to operation 1006.

With reference again to operation 1006, if a module is not present, the process terminates.

Figure 11:
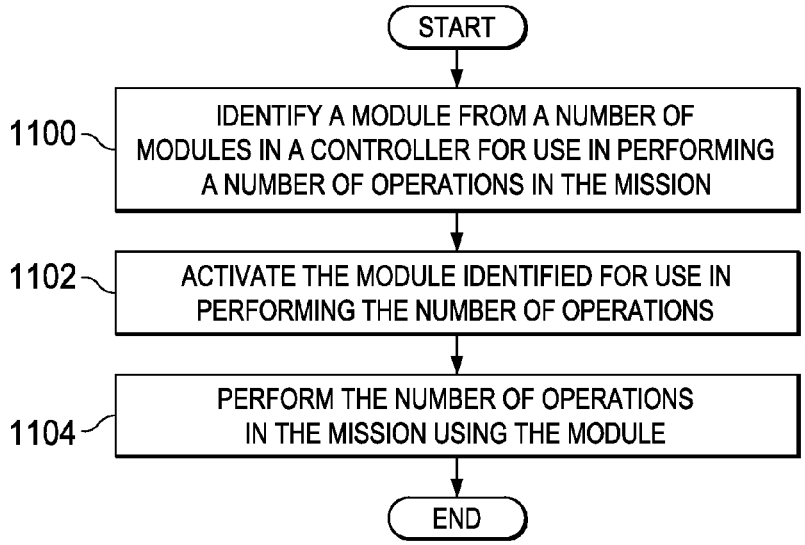
FIG. 11 is an illustration of a flowchart of process for using a controller to perform a mission in accordance with an advantageous embodiment.

With reference now to FIG. 11, an illustration of a flowchart of a process for using a controller to perform a mission is depicted in accordance with an advantageous embodiment. The process illustrated in FIG. 11 may be performed using controller 216 in FIG. 2.

The process begins by identifying a module from a number of modules in a controller for use in performing a number of operations in the mission (operation 1100). The select module may be a module such as those illustrated in modules 400 in FIG. 4. In these illustrative examples, those modules may be pre-delivery mission modules 404 and/or mission modules 406. Of course, if the mission is to deliver an airdrop system, airdrop navigation module 402 also may be selected.

The process then activates the module identified for use in performing the number of operations (operation 1102). The activation of the module may be made by selecting the module through a user input. The number of operations in the mission are then performed using the module (operation 1104), with the process terminating thereafter.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 12, an illustration of a data processing system is depicted in accordance with an advantageous embodiment. In this illustrative example, data processing system 1200 includes communications fabric 1202, which provides communications between processor unit 1204, memory 1206, persistent storage 1208, communications unit 1210, input/output (I/O) unit 1212, and display 1214.

Data processing system 1200 is an example of a data processing system that may be used to implement computers in computer system 230 in FIG. 2.

Processor unit 1204 serves to execute instructions for software that may be loaded into memory 1206. Processor unit 1204 may be a number of processors, a multi-processor core, or some other type of processor, depending on the particular implementation. A number, as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208.

Computer readable storage media 1224 also may take the form of a persistent storage, such as a hard drive, a thumb drive, or a flash memory, that is connected to data processing system 1200. In some instances, computer readable storage media 1224 may not be removable from data processing system 1200. In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different advantageous embodiments may be implemented in a data processing system including components in addition to or in place of those illustrated for data processing system 1200.

Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1206, or a cache, such as found in an interface and memory controller hub that may be present in communications fabric 1202.

Thus, the different advantageous embodiments provide a method and apparatus for controllers in airdrop systems that have functionality beyond guiding the airdrop system to a target location. In this manner, airdrop control may be provided for airdrop systems, as well as providing a device that has usefulness in other tasks other than the airdrop itself. The controller, in these examples, is a multi-function controller that provides modules for other tasks or functions that may be needed after the payload has been delivered. Further, the modules also may be used in tasks or functions prior to the airdrop system being dropped out of the aircraft.

With controller 216 in FIG. 2, functions, such as translation, collaboration, communication, supply management, cargo management, and other tasks may be performed using controller 216. Further, in the different advantageous embodiments, rechargeable power system 232 provides an additional component that may be used to recharge controller 216 after airdrop system 202 has reached target location 210 in FIG. 2. Further, rechargeable power system 232 also may be used to recharge other devices, depending on the particular implementation.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a housing;
    a processor unit;
    a display;
    a navigation module configured to guide an airdrop system to a target location; and
    a number of modules configured to provide functions for use by a number of operators to perform a mission in addition to delivering the airdrop system to the target location, the number of modules comprising at least one of: a payload inventory module, a supply module, and an information module.

2. The apparatus of claim 1, wherein the number of modules is selected from at least one of: a pre-delivery mission module, and a module configured to perform operations after delivery of the airdrop system to the target location.

3. The apparatus of claim 2, wherein the pre-delivery mission module comprises a loading module.

4. The apparatus of claim 2, wherein the module configured to perform operations after delivery of the airdrop system to the target location is selected from one of: a map module, a translator module, a chat module, a medical module, a training module, and a module configured to control a device other than the apparatus.

5. The apparatus of claim 1, further comprising:
    the housing, the processor unit, and the display configured as a mobile device;
    the information module configured to at least one of: locate an object, and identify the object; and
    the supply module configured to at least one of: track usage of a supply, and order the supply.

6. The apparatus of claim 1, wherein the housing, the processor unit, the display, the navigation module, and the number of modules form a controller and further comprising:
    a rechargeable power system configured to be connected to the controller and configured to provide power to the controller.

7. The apparatus of claim 1, wherein the mission is performed prior to delivering the airdrop system to the target location.

8. The apparatus of claim 1, wherein the mission is performed after delivering the airdrop system to the target location.

9. The apparatus of claim 1, wherein the number of modules is configured to be used only by an operator authorized to use the number of modules.

10. A method for configuring a controller for an airdrop system, the method comprising:
    programming, using a computer system, an airdrop navigation module in the controller, the airdrop navigation module guiding the airdrop system to a target location; and
    programming, using the computer system, an additional module in the controller for conducting a mission, such that the mission is in addition to delivering the airdrop system to the target location, the additional module comprising at least one of: a payload inventory module, a supply module, and an information module.

11. The method of claim 10, further comprising programming the airdrop navigation module prior to delivering the airdrop system to the target location.

12. The method of claim 10, further comprising: the controller being a handheld mobile device;
    the information module configured to at least one of: locate an object, and identify the object; and
    the supply module configured to at least one of: track usage of a supply, and order the supply.

13. The method of claim 10, wherein the controller comprises a housing, a processor unit, and a display.

14. The method of claim 10, further comprising the additional module being at least one of: a pre-delivery mission module, and a module configured for performing operations after delivery of the airdrop system to the target location.

15. The method of claim 14, further comprising the pre-delivery mission module comprising a loading module.

16. The method of claim 14, further comprising the mission module being one of: a map module, a translator module, a chat module, a medical module, a training module, and a module controlling a device other than the airdrop system.

17. The method of claim 10, wherein the mission is performed prior to delivering the airdrop system to the target location.

18. The method of claim 10, wherein the mission is performed after delivering the airdrop system to the target location.

19. A method for performing a mission prior to or after delivering an airdrop to a target location, the method comprising:
    facilitating performing the mission, using a module, from a number of modules in a controller, configured to perform a number of operations in the mission such that the mission is in addition to using the controller for delivering the airdrop to the target location, and the controller comprises:
    a housing;
    a processor unit;
    a display;
    a navigation module configured to guide an airdrop system to the target location; and
    the number of modules configured to provide functions for use by a number of operators to perform operations for the mission; and
    performing at least one of the number of operations in the mission using the module.

* * * * *